GEORG WEISHEIT
INVENTOR.

BY Karl J. Ross
AGENT

United States Patent Office 3,267,958
Patented August 23, 1966

3,267,958
STABILIZING SYSTEM FOR FLUID PARAMETERS
Georg Weisheit, 37 Trappenbergstr.,
Essen-Stadtwald, Germany
Filed June 22, 1964, Ser. No. 376,849
9 Claims. (Cl. 137—486)

My present invention relates to an automatic system for the stabilization of variable parameters or physical conditions of fluids, such as flow velocity, pressure, temperature, etc., of liquid or gaseous media.

It is known to stabilize such parameters with the aid of a sensing device, e.g., a flow meter, which determines the instantaneous magnitude of the parameter in question and supplies this information in the form of an electric signal to an actuating mechanism for a suitable controller, such as a valve inserted in the flow path of the fluid to be regulated. In prior systems of this type, however, it was generally necessary to rely upon auxiliary sources of power, represented by generators of hydraulic or pneumatic pressure, in order to effect the necessary compensating adjustment of the control device at a rate commensurate with the extent of departure from a predetermined value as detected by the sensor. This is so because known electric servomotors are not as effective as fluid-operated actuators in establishing a controlled rate of displacement for a flow regulator, mixer or the like; they cannot be reliably operated at high speeds, owing to the danger of overshooting their range upon possible failure of a limit switch, and are subject to a great deal of wear. Hydraulic or pneumatic actuators, however, are expensive to operate because of the required pressure fluid and are also difficult to maintain in good working order.

The general object of my invention is to provide an automatic control system of the aforedescribed character which avoids the drawbacks noted above and which operates exclusively on electric energy without any auxiliary power source.

Another object of my invention is to provide an improved electric servomotor for use in a system of this type.

In accordance with this invention I provide two separate signal generators responding indpendently but concurrently to the output of an associated sensing device, one of these signal generators producing a switching signal (e.g., in the form of a substantially constant voltage) whenever the parameter to be regulated departs in a certain sense from a predetermined value, the other generator producing a voltage which varies progressively with the extent of the departure of this parameter from its predetermined value and whose magnitude, therefore, depends upon the extent of such departure. The switching signal is then applied to an actuator in order to displace it in a predetermined direction, generally against a suitable biasing force, whereas the progressively varying voltage acts upon an adjustable retardation device, such as a hydraulic brake, in a manner controlling the rate of displacement of the actuator (and, therefore, of flow regulator or similar device linked thereto) so that this rate is substantially proportional to the extent of the departure of the parameter from its reference value. According to a more specific feature, the actuator is a servomotor in the form of a hydraulic cylinder connected with a source of oil or other fluid through a conduit which includes a throttle valve determining its effective cross-sectional area, the throttle valve being controlled by a solenoid in response to the progressively varying voltage whereas the piston cylinder is displaced either by a biasing force (e.g., a spring) or, in the presence of the switching signal, by another solenoid acting in the opposite direction; thus, the rate of displacement in either direction is determined by the position of the throttle valve which in turn depends on the departure of the regulated parameter from a predetermined mean. In this case the switching signal will come into existence only when the departure lies in a range on one side of the mean, the control voltage for the throttle valve varying preferably symmetrically on opposite sides of the mean.

The above and other objects and features of my invention will become more fully apparent from the following detailed description of a specific embodiment, reference being made to the accompanying drawings in which.

Figure 1:
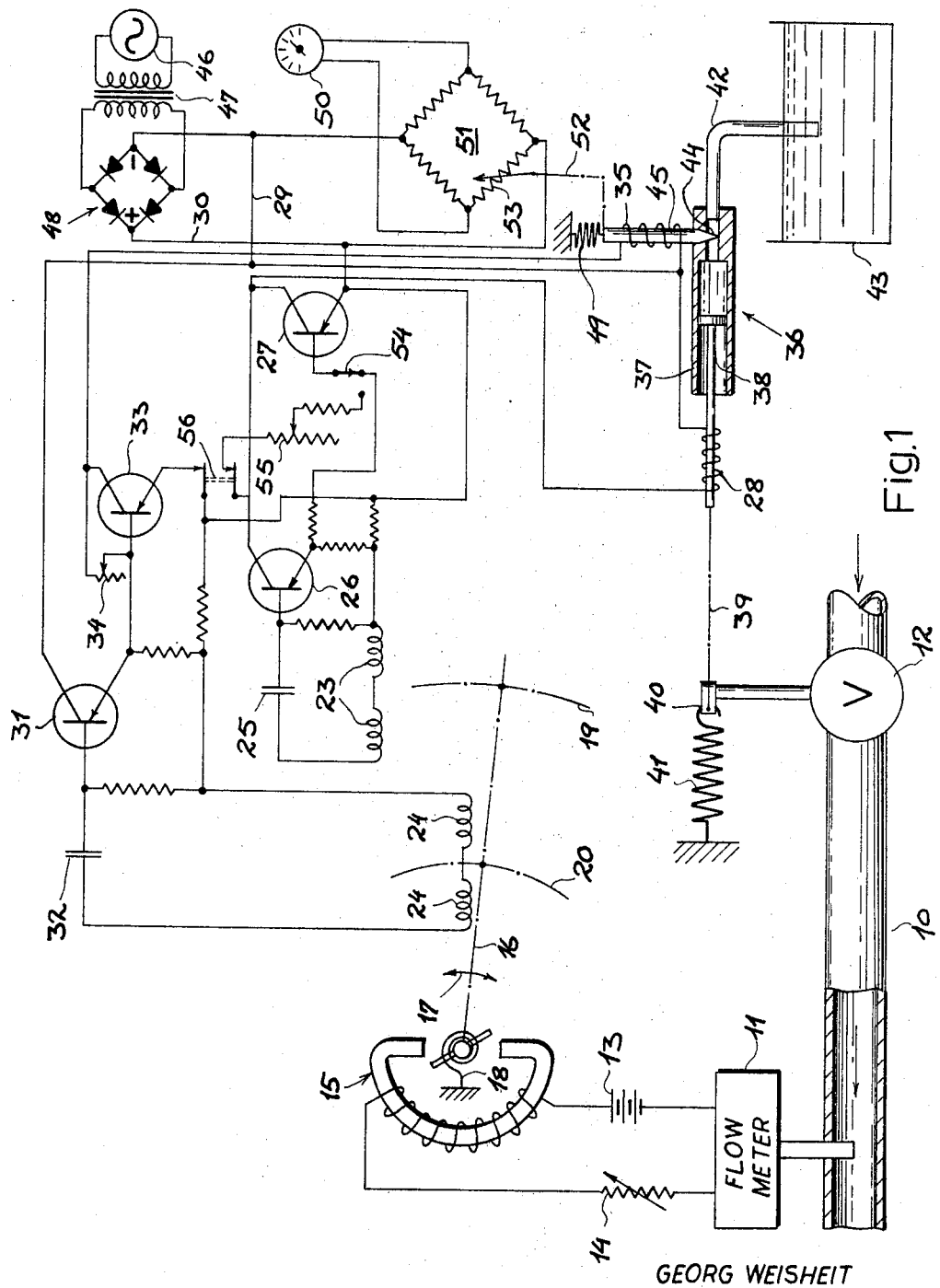
FIG. 1 is a circuit diagram of a control system according to my invention.

The system shown in FIG. 1 serves for the stabilization of a flow of liquid in a pipe 10 which is provided with a flow meter 11, sensing the fluid volume per unit of time, and with a regulating valve 12 upstream of meter 11. The output circuit of the flow meter includes a source of direct current, shown diagrammatically as a battery 13, and a variable resistor 14 in series with a galvanometer 15 whose indicator needle 16 is swingable, as indicated by arrow 17, about its illustrated reference position in which the output current of meter 11 just balances the restoring force of a hair spring 18. It will be apparent that, through suitable manipulation of the variable resistance 14, the illustrated reference position of needle 16 may be selectively assigned to a variety of flow rates of the liquid in pipe 10.

Figure 2:
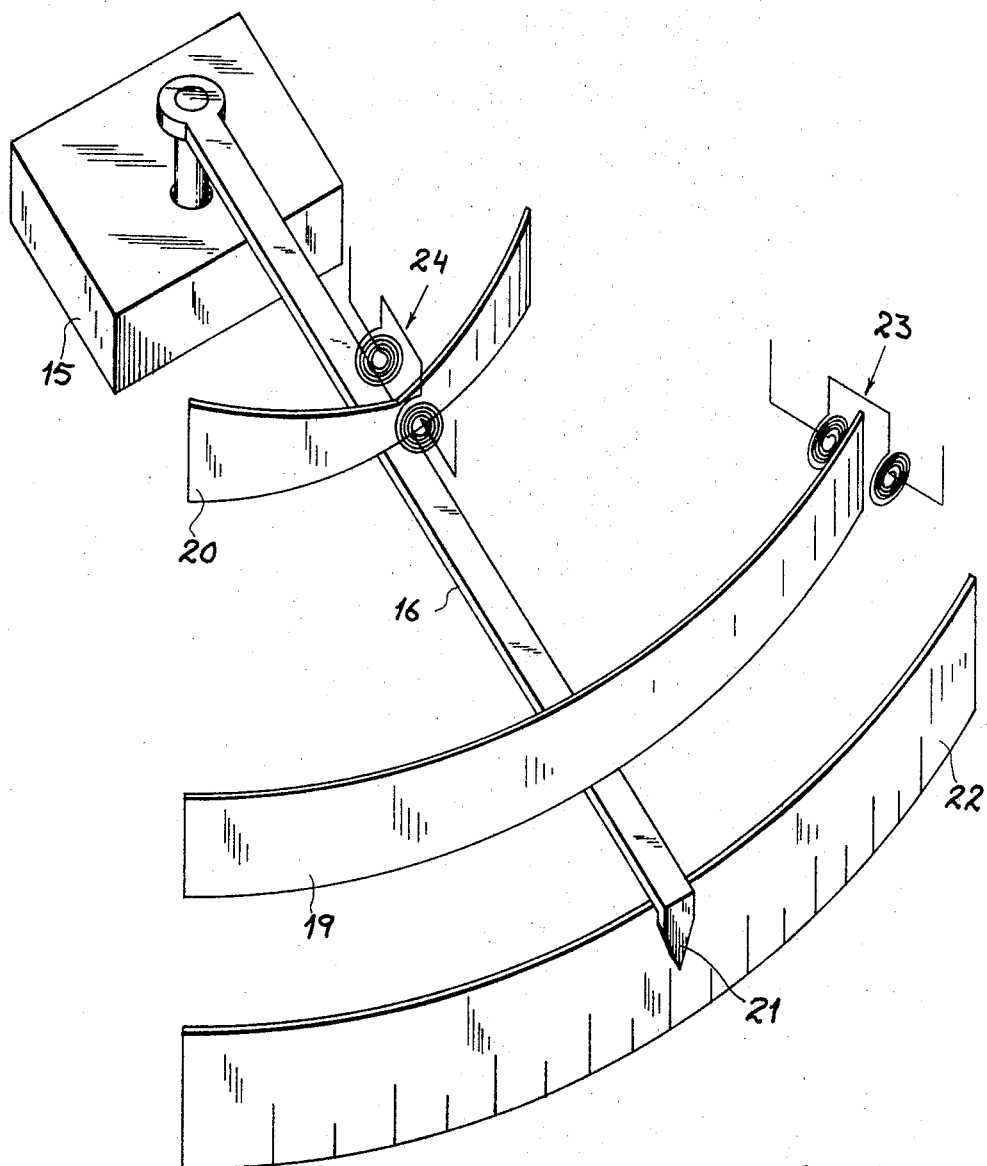
FIG. 2 is a somewhat diagrammatic perspective view of a control member forming part of the system of FIG. 1.

The galvanometer needle 16, as more clearly seen in FIG. 2, carries a pair of magnetically permeable armatures 19, 20 as well as a pointer 21 playing on a scale 22. Armature 20 extends symmetrically on both sides of needle 16 and is generally bowtie-shaped so as to increase progressively in width with increasing distance from the needle; armature 19 is of constant width and, as shown, is so positioned relatively to a dual inductance coil 23 as to approach this coil in the reference position of needle 16. Another dual inductance coil 24 straddles the narrow waist of armature 20 in the same position. The two halves of each coil 23, 24 are so wound that, to the extent of their mutual coupling by the interposed armature 19 or 20, their inductances cancel each other so that the impedance of coil 23 decreases abruptly upon a counterclockwise swing of needle 16 whereas that of coil 24 drops progressively upon a swing of the needle in either direction.

The inductance coil 23 is connected, in series with a blocking condenser 25, between the base and the emitter of a first-stage transistor 26 whose collector, along with that of an associated second-stage transistor 27, is connected by way of a solenoid coil 28 to a negative bus bar 29; the corresponding positive bus bar 30 is connected to the emitters of these transistors. A similar relationship exists between the coil 24 and a first-stage transistor 31 whose emitter-base circuit includes a blocking condenser 32 in series with this coil; the corresponding second-stage transistor 33 includes a potentiometer 34 in its base-collector circuit to permit adjustment of its output current. The connection between bus bar 29 and the collector of transistor 33 includes another solenoid 35.

A servomotor 36 comprises a hydraulic cylinder 37 accommodating a piston 38 whose stem is integral with the core of power solenoid 28 and is connected via a linkage 39 with the control lever 40 of regulating valve 12; this control lever is biased by a contractile spring 41 in a direction opposite that in which the solenoid 28, upon its energization, tends to displace the piston 38. Cylinder 37 is connected by a conduit 42 with a vessel 43 containing a supply of hydraulic fluid; conduit 42 includes a throttle valve 44 whose movable element 45 is rigid with the core of brake solenoid 35.

A source 46 of alternating current works through a transformer 47 into a rectifier 48 delivering a pulsating unidirectional voltage to the bus bars 29 and 30. With the galvanometer needle 16 in its illustrated median position, the impedance of coils 23 and 24 is at a maximum and transistors 26 and 27 will be cut off. Transistor 31 may be slightly conductive, the same as transistor 33 whose conductivity at this stage is determined by the setting of potentiometer 34 so as to maintain the valve body 45 in a position, under the counteracting forces of solenoid 35 and a restoring spring 49, in which the throttle valve 44 opens the fluid passage of conduit 42 to a selected minimum extent. The degree of opening may be read on an indicator 50 energized from a Wheatstone bridge 51 to monitor the position of the core of solenoid 35 which is mechanically coupled at 52 with a variable resistance 53 in one of the bridge arms.

Upon a departure of the flow velocity of the fluid in pipe 10 from its predetermined reference value, needle 16 swings in one or the other direction, depending on the sense of the deviation. If this swing is counterclockwise as viewed in FIG. 1, armature 19 enters between the two halves of coil 23 to reduce its impedance. An abrupt current pulse in the output of transistor 27 energizes the cylinder 28 to move the piston 38 toward the right, against the force of spring 41, at a rate determined by the momentary opening of the throttle valve 44. That opening, in turn, depends upon the extent of the swing of needle 16 since this extent is reflected in the degree of coupling of the two halves of coil 24 by the interposed armature 20. Thus, as the output current of transistor 33 increases, it energizes the solenoid 35 to retract the valve body 45 against the pressure of spring 49 so as to increase the rate of flow through conduit 42, thereby accelerating the motion of the piston. The resulting change in the position of valve 12 introduces a compensating variation in the flow within pipe 10 so that the meter 11 tends to restore the needle 16 to normal. If, as a result of this correction, the needle 16 now overshoots its median position, armature 19 leaves the coil 23 which instantly becomes highly inductive, thereby cutting off transistors 26 and 27 so as to de-energize piston 38; spring 41 now takes over the control of solenoid 28 and moves it to the left, at a rate again determined by the throttle valve 44 in response to the output current of transistor 33 as established by the disalignment between coil 24 and armature 20.

A switch 54 enables the base of transistor 27 to be disconnected from the emitter of transistor 26 and to be connected instead to its emitter by way of a potentiometer 55; this permits adjustment of the current flow through cylinder 28 for the purpose of letting the piston 31 move in one direction or the other independently of the output of flow meter 11. A circuit breaker 56 has two contacts in series with potentiometer 55 and with the emitter of transistor 33, respectively, opening of this circuit breaker therefore deactivating the solenoid 28 and completely de-energizing the solenoid 35 so as to let the spring 49 move the valve body 45 into a position of complete closure; this action blocks the flow of fluid through conduit 42 and arrests the piston 38 in whatever position it then occupies, thereby freezing the setting of valve 12.

The system herein disclosed may, of course, be modified in various ways without departing from the spirit and scope of the invention as defined in the appended claims.

I claim:

1. A system for automatically stabilizing a variable parameter of a fluid, comprising in combination with control means for said parameter and sensing means for determining its instantaneous magnitude first signal-generating means responsive to said sensing means for producing a switching signal upon a departure of said parameter from a predetermined value; second signal-generating means responsive to said sensing means for producing a voltage progressively varying with said departure; actuating means for said control means connected to said first signal-generating means for operation in response to said switching signal; and adjustable retardation means coupled with said actuating means and connected to said second signal-generating means for varying, in response to said progressively varying voltage, the operating rate of said actuating means.

2. A system for automatically stabilizing a variable parameter of a fluid, comprising in combination with control means for said parameter and sensing means for determining its instantaneous magnitude first signal-generating means responsive to said sensing means for producing a switching signal upon a departure of said parameter from a predetermined value; second signal-generating means responsive to said sensing means for producing a voltage progressively varying with said departure; electromagnetic actuating means for said control means connected via a first amplifier circuit to said first signal-generating means for operation in response to said switching signal; and adjustable electromagnetic retardation means coupled with said actuating means and connected via a second amplifier circuit to said second signal-generating means for varying, in response to said progressively varying voltage, the operating rate of said actuating means.

3. A system for automatically stabilizing a variable parameter of a fluid, comprising, in combination with control means for said parameter and sensing means for determining its instantaneous magnitude biasing means tending to maintain said control means in one limiting position; first signal-generating means responsive to said sensing means for producing a switching signal upon said parameter assuming a value on one side of a predetermined means; second signal-generating means responsive to said sensing means for producing a voltage progressively varying with the departure of said parameter on either side of said mean; actuating means for said control means connected to said first signal-generating means for displacement of said control means toward another limiting position, against the action of said biasing means, in response to said switching signal, said biasing means being effective to restore said control means in the absence of said switching signal; and adjustable retardation means coupled with said actuating means and connected to said second signal-generating means for varying the rate of displacement of said control means, by said actuating means and by said biasing means, in response to said progressively varying voltage.

4. A system for automatically stabilizing a variable parameter of a fluid comprising, in combination with control means for said parameter and sensing means for determining its instantaneous magnitude, biasing means tending to maintain said control means in one limiting position; first signal-generating means responsive to said sensing means for producing a switching signal upon said parameter assuming a value on one side of a predetermined means; second signal-generating means responsive to said sensing means for producing a voltage progressively varying with the departure of said parameter on either side of said mean; electromagnetic actuating means for said control means connected via a first amplifier circuit to said first-signal-generating means for displacement of said control means toward another limiting position, against the action of said biasing means, in response to said switching signal, said biasing means being effective to restore said control means in the absence of said switching signal; and adjustable electromagnetic retardation means coupled with said actuating means and connected via a second amplifier circuit to said second signal-generating means for varying, in response to said progressively varying voltage, the rate of displacement of said control means by said actuating means and by said biasing means.

5. A system as defined in claim 4 wherein said actuating means includes a power solenoid, said retardation means including a hydraulic brake for said power solenoid and a solenoid valve controlling the flow of hydraulic fluid to and from said brake.

6. A system as defined in claim 5, further comprising manually operable means in said second amplifier circuit for disconnecting said solenoid valve from said second signal-generating means and moving said solenoid valve into a position of complete closure, thereby blocking said hydraulic brake and maintaining said control means in a selected position.

7. A system as defined in claim 6, further comprising manual operating means for said power solenoid in said first amplifier circuit.

8. A system as defined in claim 5 wherein said second amplifier circuit includes adjusting means for establishing a selected minimum opening for said solenoid valve.

9. A system as defined in claim 8, further comprising monitoring means coupled with said solenoid valve for visually indicating the position thereof.

References Cited by the Examiner

UNITED STATES PATENTS

| 2,652,848 | 9/1953 | Wick et al. | 251—129 X |
| 2,923,521 | 2/1960 | Ray | 251—129 X |

FOREIGN PATENTS 540,881  12/1931  Germany.

M. CARY NELSON, *Primary Examiner.*

MARTIN P. SCHWADRON, *Examiner.*